United States Patent [19]

Marzola et al.

[11] 4,429,064

[45] Jan. 31, 1984

[54] MICA-REINFORCED POLYOLEFIN COMPOSITIONS COMPRISING A MALEAMMIC SILANE MODIFIER

[75] Inventors: Roberto Marzola; Enea Garagnani, both of Ferrara; Alessandro Moro, Occhiobello, all of Italy

[73] Assignee: Montedison S.p.A., Milan, Italy

[21] Appl. No.: 393,422

[22] Filed: Jun. 29, 1982

[30] Foreign Application Priority Data

Jul. 3, 1981 [IT] Italy ............................... 22732 A/81

[51] Int. Cl.$^3$ .................... C08J 5/12; C08K 3/34; C08K 5/20; C08L 23/02

[52] U.S. Cl. .................... 523/213; 523/203; 524/188; 524/449; 525/288; 525/342

[58] Field of Search .............. 524/449, 188; 523/213, 523/203; 525/288, 342

[56] References Cited

U.S. PATENT DOCUMENTS

| | | | |
|---|---|---|---|
| 3,416,990 | 12/1968 | Robinson | 524/576 |
| 3,437,550 | 4/1969 | Paul | 523/214 |
| 3,576,031 | 4/1971 | Holub et al. | 528/34 |
| 4,198,327 | 4/1980 | Matsumoto et al. | 525/73 |
| 4,248,935 | 2/1981 | Temple | 428/391 |
| 4,278,586 | 7/1981 | Marzola et al. | 524/290 |
| 4,284,541 | 8/1981 | Takeda et al. | 524/504 |

FOREIGN PATENT DOCUMENTS

36949 10/1981 European Pat. Off. .

OTHER PUBLICATIONS

Derwent Abst. 66999c/38 8-1980 UBE Indust. J55104338.
Chem. Abs. 81-170748q Paul DE1694126, May 1974.
Chem. Abs. 89-75929f (1978) Gaehde et al. DD-129548, Jan. 1978.
Chem. Abs. 97-24901y (1982) Idemitsu JP82-42745.

*Primary Examiner*—John C. Bleutge
*Assistant Examiner*—Herbert J. Lilling

[57] ABSTRACT

Mica-reinforced polyolefinic compositions including from 30 to 90% by weight of polyolefin, from 70 to 10% by weight of mica and from 0.01 to 7% by weight, referred to the weight of the polyolefin and of the mica, of a maleammic acid or of a maleammic silane.

2 Claims, No Drawings

MICA-REINFORCED POLYOLEFIN COMPOSITIONS COMPRISING A MALEAMMIC SILANE MODIFIER

BACKGROUND OF THE INVENTION

It is known to reinforce the olefin polymers by including micas therein. In order to achieve a satisfactory adhesion between the micas and the polymer in this kind of preparations, these two components are generally treated with suitable modifiers before blending with each other. Thus, the micas can be given a surface coating consisting of silanic compounds, whereas the olefin polymers can be reacted with compounds containing carboxylic acid groups, such as acrylic or maleic acid, so as to form a chemical bond between the silanic and the carboxylic group on blending at high temperature. Like methods are disclosed for instance in Japanese Patent Publication Nos. 7953157 and 80104338.

The above mentioned methods are however cumbersome and expensive, especially because they require the modification of the whole mass of polymer involved in the blend, in a preliminary and separate step.

THE PRESENT INVENTION

This invention relates to polyolefins reinforced with micas, endowed with improved properties of mechanical resistance and containing particular additives for promoting the adhesion of the micas to the polymer.

The micas utilized for the purposes of the present invention are preferably of the "muscovite" or "flogotite" type and possess a shape ratio (or ratio between diameter and thickness) ranging from 20 to 400, and preferably from 100 to 200.

The additives employed to promote the adhesion of the micas to the polymer, according to the present invention, belong to the class of the maleammic acids and of the derivatives thereof, and have the general formula:

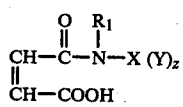   (I)

wherein:
R = H or alkyl radical containing from 1 to 18 carbon atoms,
Y = a group of formula

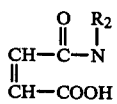   (II)

or a silane group of formula $-Si-(Z)_n$   (III)

z = 0 or 1
X, when z = 1, may be a radical of formula

or an aromatic, cycloaliphatic or heterocyclic divalent radical, while, when z = 0, X is an aliphatic, aromatic or heterocyclic radical containing a functional aminic group, or a functional epoxy, mercaptan, ester, vinylic or halogen group
$R_1$, $R_2$ = H or, when X =

and Y =

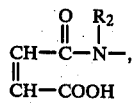

$R_1$ and $R_2$ may form together a radical of the type

Z = an alkoxy hydrolyzable group containing 1 to 6 carbon atoms, and preferably a methoxy or ethoxy group, or a halogen atom
m,n = like or unlike each other, are integers from 1 to 3, the extremes included.

Belonging to the compounds of formula (I) utilizable for the purposes of the present invention are the mono-maleammic acids and the bis-maleammic acids, such as for example N, N'-hexamethylene-bis-maleammic acid, or the N, N'-ethylene-, or N,N'-trimethylene-, N,N'piperazine-, N,N'-m-phenylene-, N,N'-3,3'-(trans-stilben-5,5'-sodium sulphonate), N,N'-4,4'-(diphenyl-ether), N,N'-4,4'-(diphenyl-methane), N, N'-2,5-dimethylene-norbornane-bis-maleammic acids and, finally, N,N'-isophorone-bis-maleammic acid. It is known how to prepare such acids, and some methods of preparation are described in particular in Italian patent application No. 27664 A/78 in the name of Montedison S.p.A.

Belonging to the compounds of formula (I) are also the products of the reaction between the maleammic acids and organofunctional silanes of general formula

   (IV)

wherein Z and n have the meaning defined hereinbefore,
$R_3$ = an aliphatic divalent radical containing 1 to 18 carbon atoms, optionally containing a heteroatom, or a cycloaliphatic or aromatic divalent radical, having one or more nuclei, optionally containing a heteroatom, or a heterocyclic radical;
y = 0 or 1,
X' = a functional group capable of reacting with the carboxylic groups of the maleammic acids, in particular an aminic, epoxy, mercaptan, ester, vinyl or halogen group.

To the compounds of formula (I) belong in particular the products of the reaction between maleic anhydride, or derivatives thereof such as for example maleic acid and the halides or esters thereof, and aminosilanes of formula

   (V)

wherein $R_3$, y, Z and n have the meaning defined hereinbefore.

The compositions object of the present invention comprise from 30 to 90% by weight of a polyolefin, from 70 to 10% by weight of mica and from 0.01 to 7% by weight, referred to the mixture of polyolefin and mica, of at least a compound according to formula (I).

Such compositions can be prepared by mixing the polymer with the mica and the additive in any possible orders, and by successively bringing the mixture to a temperature at least equal to the polymer melting temperature, by operating in proper mixers and according to the technologies usually employed for preparing the mixes of thermoplastic polymers.

Instead of the additives of formula (I) as such, it is possible to mix, with the mica and the polymer, the precursor compounds of such additives, which successively, during the hot mixing, molding, extrusion steps, react at least partially with one another to originate the additive comprised in such formula.

It is possible, for example, to mix with the mica and the polyolefin a silane derivative comprised in formula (I), or, optionally mixed with each other, the maleic anhydride (or a derivative thereof) and a silane of formula (III), or a silane of formula (III) and an amine capable of providing, in the successive hot mixing step, or in the molding or extrusion steps, the corresponding silane derivative. Preferred amines are generally the cycloaliphatic amines containing more than 6 carbon atoms, such as for example isophrone-diamine and bis-aminomethyl-norbornane. The addition of the various components, including the abovesaid precursors, to obtain the final composition can be accomplished in any succession, provided the final composition has a homogeneous structure.

As polyolefins it is possible to use polyethylene, polypropylene, the random or block ethylene/propylene copolymers, 4-methyl-pentene-1, polybutene-1.

The following examples are given to illustrate the present invention, without being however a limitation thereof.

EXAMPLES 1-3 (COMPARATIVE TESTS)

There were prepared three mixtures, each consisting of 1200 g of polypropylene in flakes (M.I.=12) with 800 g of mica of types (a), (b) and (c) respectively, the characteristics of which are recorded on Table I.

Each mixture was additioned with 0.1% by weight, referred to the polymer weight, of tetra-[3-(3,5-di-t.butyl-4-hydroxyphenyl)-propionate] of pentaerythritol and with 0.1% by weight of 2,6-di-t.butyl-p.cresol (antioxidants). The mixtures were extruded at 250° C. in a Pasquetti two-screw extruder. From such extruded, test pieces were prepared for the characterization, by using an injection press type V 160/72 available from GBF, Bresso (Italy), operating under the following conditions:

| | |
|---|---|
| temperature of the press body and head | 250° C. |
| temperature of the mold | 25° C. |
| injection time for test pieces for tensile tests | 20 seconds |
| total cycle for test pieces for tensile tests | 70 seconds |
| injection time for test pieces for bending, impact and HDT tests | 80 seconds |
| total cycle for test pieces for bending, impact and HDT tests | 100 seconds. |

The characteristics observed on such test pieces are indicated in table II.

EXAMPLES 4-6

Examples 1-3 were repeated, except that the micas were pretreated (mixed) in a mixer for powders with 18% by weight (calculated on the mica weight) of a maleammic silane of formula:

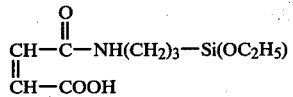

prepared by reacting maleic anhydride and γ-aminopropyl-triethoxysilane at about 40° C., in a nitrogen atmosphere, in a molar ratio of 1/1. The characteristics of the compositions are recorded on table II.

EXAMPLE 7

By operating as in examples 1-3, two mixtures were prepared, each consisting of 1200 g of the same polypropylene with 800 g of mica, type (b), which had undergone a pretreatment (addition) in a mixer for powders at first with 0.4% by weight, referred to the mica weight, of γ-aminopropyl-triethoxysilane and successively with 0.6% by weight of N, N'-isophorone-bismaleammic acid. The characteristics of the test pieces obtained by extrusion from such mixture are recorded on table II.

EXAMPLE 8

Operation was as in example 7, except that the mica had been pretreated first with 0.7% by weight, referred on the mica weight, of γ-aminopropyl-triethoxysilane and successively with 0.3% by weight of maleic anhydride.

The characteristics of the extruded mixes are recorded on table II.

TABLE I

| Particle size distribution | Mica type | | |
|---|---|---|---|
| | (a) MICROMIX 200 | (b) MICA DRY 40/80 Mesh | (c) MICA WATER-GROUND |
| 420% | — | 16.2 | — |
| 420-350% | — | 11.3 | — |
| 350-297% | 1.6 | 11.1 | — |
| 297-250% | 1.7 | 7.6 | 0.1 |
| 250-177% | 6.8 | 17.1 | 0.2 |
| 177-105% | 17.6 | 18.4 | 0.8 |
| 105-53% | 46.0 | 11.0 | 32.7 |
| 53-37% | 12.4 | 7.3 | 38.0 |
| 37% | 13.9 | — | 28.2 |
| Tamped apparent density | 0.913 | 0.740 | 0.426 |
| Shape ratio | 25 | 54 | 170 |

| | EXAMPLES | | | | | | | |
|---|---|---|---|---|---|---|---|---|
| | 1 mica (a) | 2 mica (b) | 3 mica (c) | 4 mica (a) | 5 mica (b) | 6 mica (c) | 7 mica (b) | 8 mica (b) |
| Modulus of elasticity to flexure | 43000 | 53000 | 72000 | 46000 | 62000 | 77000 | 60000 | 61000 |

|  | EXAMPLES | | | | | | | |
|---|---|---|---|---|---|---|---|---|
|  | 1 mica (a) | 2 mica (b) | 3 mica (c) | 4 mica (a) | 5 mica (b) | 6 mica (c) | 7 mica (b) | 8 mica (b) |
| kg/cm² (ASTM 790) | | | | | | | | |
| Ultimate tensile stress kg/cm² (ASTM 38) | 290 | 308 | 372 | 330 | 428 | 428 | 420 | 425 |
| Elongation at break % (ASTM 638) | 9 | 7 | 5 | 7 | 4 | 4 | 4 | 4 |
| Izod resiliency determined by notched-bar test (ASTM 256) | 3.4 | 3 | 3 | 3.2 | 3 | 2.8 | 3.2 | 3.1 |
| HDT with 18.5 kg °C. (ASTM 648) | 80 | 81 | 107 | 98 | 99 | 116 | 98 | 99 |
| Creep under bending at 80° C. for 8 hours, with 100 kg, determined in the middle of the tensile test specimen (distance between the supports = 4 cm) | 1.75 | 1.57 | 0.94 | 1.34 | 0.98 | 0.94 | 0.99 | 0.99 |
| Melt index of the composition (ASTM 1238) | 6.3 | 5.3 | 3.4 | 6.2 | 3.6 | 3.2 | 3.7 | 3.6 |

What I claim is:

1. Polyolefinic compositions comprising from 30% to 90% by weight of an olefinic homopolymer or copolymer and from 70% to 10% by weight of mica pretreated by the addition on its surface of from 0.01% to 7% by weight, referred to the weight of the mixture of polymer and mica, of at least one compound having the general formula

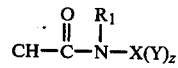

wherein z is an integer equal to 0 or 1;
X, when z is 1 is a radical of formula

or an aromatic, cycloaliphatic or heterocyclic divalent radical, while when z is 0, X is an aliphatic, aromatic or heterocyclic radical containing a functional, aminic, or epoxy, mercaptan, ester, vinyl or halogen group;

R₁ is hydrogen; and
Y is a silane group of formula

in which

Z is an alkoxyl hydrolyzable group containing from 1 to 6 carbon atoms; and
n is an integer from 1 to 3, extremes included.

2. The compositions according to claim 1, in which the compound of general formula (I) is obtained by reaction between γ-aminopropyltriethoxysilane and N,N'-isophorone-bismaleammic acid.

* * * * *